Sept. 15, 1925.                                          1,553,658
                      S. APOSTOLOFF
                         DRY CELL
              Original Filed Oct. 10, 1918

Inventor
Serge Apostoloff
By his Attorneys
Williams & Pritchard

Patented Sept. 15, 1925.

1,553,658

UNITED STATES PATENT OFFICE.

SERGE APOSTOLOFF, OF NEW YORK, N. Y.

DRY CELL.

Original application filed October 10, 1918, Serial No. 257,651. Divided and this application filed November 11, 1919. Serial No. 337,227.

*To all whom it may concern:*

Be it known that I, SERGE APOSTOLOFF, a subject of the King of Great Britain, residing in the borough of Manhattan, city, county, and State of New York, have invented certain new and useful Improvements in Dry Cells, of which the following is a specification.

This invention relates to battery cells, and has for its object to construct dry cells in such a manner that no portion of their normal life will be wasted, and also so that they may, when desired, be put immediately into use and at their full power.

A further object of this invention is to so form such cells that the positive and negative electrodes will be out of operative position during the period of the inaction of the cell, but so that the cells may be thrown into instant electrical activity whenever desired by a simple and quickly accomplished manipulation of the battery parts, without the addition of water, or the necessity of first separating the electrode elements for the removal of parts.

A further object of my invention is to provide a new electrolytic mix, of a semi-solid nature, that will retain its form indefinitely when molded, pressed, or otherwise formed into a desired shape or mass, until forcibly disturbed therefrom; and that at the same time will flow freely upon force or pressure being applied to it.

A further object of my invention is to provide positive means for holding and retaining the electrode elements of the cell isolated from each other during the period of inaction, and at the same time permit of immediate assemblage of parts whenever it is desired to put the cell into use.

A further object of my invention is to provide a cell with two opposed telescoping cups, one of the cups being of insulating material and carrying the bobbin electrode, and the other cup forming the second electrode and initially carrying the paste electrolyte.

This application is a division of my co-pending application Serial No. 257,651, filed October 10, 1918.

The above and other objects of my invention are set forth in the following specification and illustrated in the accompanying drawings in which.

Figure 1:
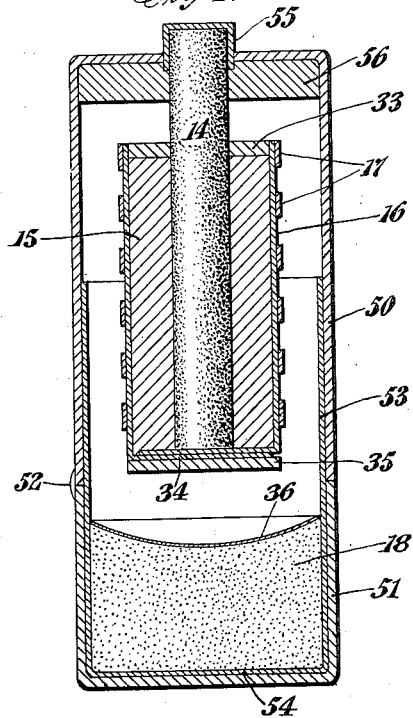
Figure 1 is a sectional view of a dry cell made in accordance with my invention with the parts out of operative position.
Figure 2:
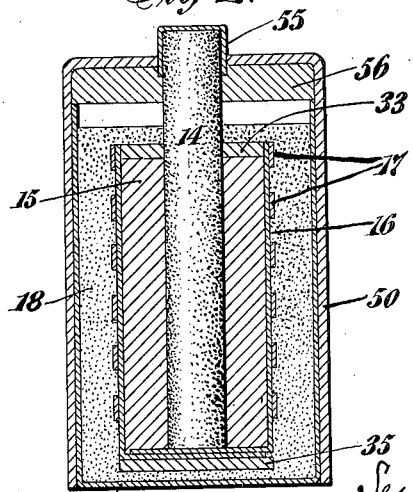
Figure 2 is a sectional view of the parts of Figure 1 assembled for immediate use.

Heretofore dry battery cells have commonly been formed by one of two methods; either the battery cell has been completely made with the electrode and active electrolytic salts in place, in which case electrical activity commences at once, or by the second method the cell is completely formed and assembled, but with dry electrolytic salts, so that the addition of a liquid is required before electrical activity sets up.

By the first method the useful life of the cell is shortened by the exact length of time it remains unused, and it frequently happens that it becomes exhausted and useless while on the shelves of dealers, or is practically exhausted and has but a short life when it comes into the hands of a user.

In the second method, the cell does not acquire its full strength immediately owing to the fact that a considerable period of time is required for the absorption of the liquid.

My electrolytic mix may be formed in a semi-liquid state, of materials which may include elements which render the mix non-drying, so that the mix will remain in whatever shape it is molded, pressed or otherwise formed into, and at the same time possess a sufficient degree of fluidity to yield and flow readily upon sufficient force of pressure being applied.

I preferably prepare this mix from the usual salts at present in general use, which I dissolve in water, and then add an equal volume of powdered cellite or kieselguhr, and from 7½ to 11 per cent of its volume according to its strength, of agar-agar mixed or emulsified with one tenth part by weight of either glycerine or still bottoms produced by the distillation of mineral or petroleum oils. If desired the agar-agar can be replaced by starchy powder of wheat or other flour, but in this case the compound must be heated to about 82° C. when the right consistency and properties are obtained.

The battery cell illustrated is well adapted for use in small flashlights either singly, in tandem, or in multiple units placed end to end. The bottom of each zinc electrode forms one contact point and a metallic cap upon the top of the bobbin forms the other.

Referring now to the drawings, the bobbin includes the carbon electrode 14 and the depolarizing mass 15 which may be enclosed in a wrapping of bibulous material 16 which in turn is contained within the bands 17. A metallic terminal or contact cap 55 is secured upon the top of the carbon electrode 14. In order to maintain the depolarizing mass 15 insulated within the bibulous casing 16 I provide a washer-like layer 33 of wax at the upper end of the bobbin, while below the inturned bottom 34 formed with the casing is a similar wax layer 35.

Although I prefer the above described construction of bobbin, I desire it to be understood that I am not to be limited thereto, but may employ the conventional form of bobbin where the depolarizer is enclosed in a cloth bag within the spirit of my invention.

The bobbin is held rigidly suspended in the center of the cup-shaped outer container 50 by means of the seal 56 of wax or other suitable material.

In initial position the upper container 50 rests upon the inverted cup-shaped lower container 51. The cup-shaped outer containers 50 and 51 may be formed of any suitable waterproof insulating material, but I prefer to employ paraffined cardboard or the like.

The cup-shaped zinc electrode 53 is in the form of an inner container whose bottom 54 is adapted to act as a contact point when the cell is in action. The electrolytic mix 18 may be placed in the bottom of the zinc container 53 according to any desired method as by pouring while still in a fluid state, or inserting it in the form of molded cakes. When prepared the mix will be sufficiently solid to preserve its form, softness and elasticity for an indefinite period of time, and yet will easily flow when mechanical pressure is applied to it.

The electrolytic mix 18 is normally covered by a wax film 36 or other frangible material adapted to remain in place until disrupted by force.

The length of the upper container 50 is such that it will be flush with the bottom of the zinc electrode 53 when the parts of the cell are telescoped. The inverted outer container 51 is shorter than the top container 50, and is made of such a length that the bottom of the bobbin will be held slightly above the top of the electrolytic mix so long as the cell is in its original inactive position. When the parts are in this position, the outer containers 50 and 51 may be sealed together as by one or more manufacturer's seals 52.

The bottom of the zinc cup 53 fits snugly in the lower outer container 51 so that relative movement of these parts will be prevented until it is desired to use the cell.

The lower container 51 not only holds the upper container 50 and the bobbin in inoperative position, but protects the zinc cup from abrasion. It also aids in hermetically sealing the electrolyte paste. This form of cell requires the use of but a single zinc cup and hence is economical of zinc. Furthermore, since the tubular container 50 is entirely of non-conducting material, the cells may be placed directly in small metallic flashlight receptacles without the use of the customary insulating covering required in the ordinary dry cells where the metallic electrode itself forms the outer container.

When it is desired to use a cell so constructed, it will only be necessary to break the manufacturer's seals and remove the bottom portion 51 of the outer container, when the lower portion of the zinc electrode may be pushed upwardly inside the portion 50 of the outer container, carrying the electrolytic mix with it, which is immediately forced around and into intimate contact with the bobbin so that electrical energy will be at once available.

In this type of cell a detent member may be formed with the zinc electrode (not shown) for engagement with the upper portion of the outer container to positively prevent said electrode from moving upward into said container until forcibly so moved, but as these parts will be constructed to closely fit each other, frictional contact between them will in most cases be sufficient to hold them in place.

While the sliding fit between the zinc electrode 53 and the outer container 50 is sufficiently close for frictional contact, the fit is not perfectly air tight. This construction permits the entrapped air to escape when the parts are telescoped.

It should be understood that my cells may be of the usual construction and form as to elements not included within my invention, and that the depolarizing mass employed is formed of the usual and well known component parts.

It will thus be seen that by my invention a battery cell is produced that remains entirely inactive during the period of non-use; that is always ready for use; whose life is not shortened during inaction; that can be put into use in a moment's time without adding water or other liquid, and without separation of the electrode members from one another; that will develop its maximum activity immediately when put into use, and that will then be available to give energy until its active elements are exhausted.

As will be noted, the member 36 forms a frangible partition separating the electrolytic mass from the electrodes and should an electrolytic mass of a substantially non-cohesive nature be employed this partition will serve to prevent premature or inadvertent contact between the electrodes and electrolytic mass.

Having thus described my invention, what I claim as new and desire to secure by Letters Patent, is:

1. In a dry cell of the type where the electrolyte is kept out of operative position until it is desired to put the cell into use, a bobbin consisting of a carbon electrode and a depolarizing mass, and a tubular sleeve of non-conducting material surrounding the bobbin and connected thereto.

2. In a dry cell of the type where the electrolyte paste is kept out of operative position until it is desired to put the cell into use, a paste container, a bobbin consisting of a carbon electrode and a depolarizing mass, and a tubular sleeve of non-conducting material surrounding the bobbin and connected thereto.

3. In a dry cell of the type where the electrolyte is kept out of operative position until it is desired to put the cell into use, a paste container, a bobbin consisting of a carbon electrode and a depolarizing mass, and a guiding sleeve of non-conducting material attached to and extending substantially the full length of said bobbin and acting as a centering member for said paste container.

4. In a dry cell of the type adapted to remain inactive until it is desired to put the cell into use, a bobbin consisting of a carbon electrode and a depolarizing mass, a tubular sleeve of non-conducting material connected to the bobbin and spaced therefrom, a cup-shaped member fitting said tubular sleeve and means whereby the cell may be put into activity on relative movement of the tubular sleeve and the cup-shaped member.

5. In a dry cell adapted to remain inactive until it is desired to put it into use, a cathode, a sleeve of non-conducting material surrounding said cathode and connected thereto, and an anode fitting said sleeve containing material for activating the cell.

6. In a dry cell adapted to remain inactive until it is desired to put it into use, a cathode, a depolarizer for said cathode, a sleeve of non-conducting material surrounding said cathode and connected thereto, and a cup-shaped anode fitting the sleeve containing material for activating the cell.

7. In a dry cell of the type described, a bobbin consisting of a carbon electrode and depolarizing mass, a cardboard tubular sleeve surrounding the bobbin and connected thereto, and a zinc cup fitting said sleeve containing paste.

8. In a dry cell of the type described, a bobbin consisting of a carbon electrode, and a depolarizing mass, a tubular cardboard sleeve surrounding the bobbin and connected thereto, and a zinc cup fitting inside said sleeve containing material for activating the cell.

9. In a dry cell of the type described, two opposed telescoping cup-shaped members, one of said members forming an electrode and the other being of non-conducting material, and means for rendering the cell active upon moving one cup-shaped member relative to the other.

10. In a dry cell of the type described, two opposed telescoping cup-shaped members, one of said members forming an electrode and the other being of fibrous material, and means for rendering the cell active upon moving one cup-shaped member relative to the other.

11. In a dry cell of the type described, a bobbin consisting of a carbon electrode and a depolarizing mass, a tubular sleeve of insulating material surrounding the bobbin and connected thereto, and a zinc cup fitting inside said sleeve and containing material for activating the cell.

12. In a dry cell of the type described, two opposed cup-shaped outer containers, a bobbin suspended in the upper of said containers, a zinc cup-shaped electrode resting inside the lower of said containers, said zinc electrode containing paste, the bobbin being held initially spaced from said paste, and the two outer containers being secured against relative movement.

13. In a dry cell of the type described, two opposed cup-shaped outer containers one of which is of non-conducting material, one of said containers carrying the carbon electrode suspended therein and the other of said containers supporting the zinc electrode.

14. In a dry cell adapted to remain inactive until it is desired to put the cell into use, an outer container composed of two opposed cup-shaped members, one of said members carrying the anode and the other member carrying the cathode, and means to activate the cell upon moving the electrodes relative to one another.

15. In a dry cell adapted to remain inactive until it is desired to put the cell into use, an outer container composed of two opposed members, one of said members carrying the anode and the other member carrying the cathode, and means to activate the cell upon moving the electrodes relative to one another.

16. In a dry cell a sleeve of non-conducting material adapted to support one electrode and to act as an insulator for the other electrode when the battery is in use.

17. In a dry cell of the type described, a sleeve of non-conducting material secured to the carbon electrode and acting as an outer insulator for the zinc electrode when the battery is in use.

18. In a dry cell of the type described, a container of non-conducting material adapted to support the cathode out of contact with the electrolyte when the battery is inactive and to insulate the anode when the battery is active.

19. In a dry cell of the type described, a sleeve secured to the cathode adapted to form an insulator for the outer surface of the anode when the battery is put into use.

20. In a dry cell adapted to remain inactive until put into use, a sleeve of non-conducting material adapted to form a support for the cathode and an outer container for the cell, and means cooperating with said sleeve to hold the battery elements in inactive position until the battery is put into use.

21. In a dry cell battery, the combination with a metallic cup, an electrolyte therein, means to hold the electrolyte in the cup, a depolarizing member and a contact member leading therefrom, of means to hold the depolarizing member preliminarily spaced from the cup and electrolyte, said holding means comprising a tubular member surrounding the cup, and having a discardable portion.

22. A dry cell battery of the nature set forth in claim 1 in which the surrounding member is a tube of non-metallic nature.

23. A battery of the nature set forth in claim 2 in which the discardable member is a short tube of non-metallic structure abutting against the end of the other non-metallic tube.

In testimony whereof, I have affixed my signature to this specification.

SERGE APOSTOLOFF.